(12) United States Patent
Fantaye et al.

(10) Patent No.: US 10,904,900 B2
(45) Date of Patent: *Jan. 26, 2021

(54) SCHEDULING OF DELAY-SENSITIVE TRAFFIC

(71) Applicant: Telefonaktiebolaget LM Ericsson (publ), Stockholm (SE)

(72) Inventors: Girum Fantaye, Ottawa (CA); Ying Sun, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/600,184

(22) Filed: Oct. 11, 2019

(65) Prior Publication Data
US 2020/0045717 A1 Feb. 6, 2020

Related U.S. Application Data

(63) Continuation of application No. 16/044,468, filed on Jul. 24, 2018, now Pat. No. 10,448,416, which is a
(Continued)

(51) Int. Cl.
*H04W 72/12* (2009.01)
*H04W 72/14* (2009.01)
(Continued)

(52) U.S. Cl.
CPC ....... *H04W 72/1226* (2013.01); *H04W 72/14* (2013.01); *H04W 74/04* (2013.01);
(Continued)

(58) Field of Classification Search
CPC . H04L 41/06; H04L 43/0817; H04L 43/0882; H04L 63/0272; H04L 63/102;
(Continued)

(56) References Cited

U.S. PATENT DOCUMENTS

| 8,848,553 B2 | 9/2014 | Song et al. |
| 2004/0176076 A1 | 9/2004 | Uppuluri |

(Continued)

FOREIGN PATENT DOCUMENTS

| WO | 2008115110 A1 | 9/2008 |
| WO | 2010077051 A2 | 7/2010 |

(Continued)

OTHER PUBLICATIONS

3GPP TS 36.213, 3rd Generation Partnership Project; Technical Specification Group Radio Access Network; Evolved Universal Terrestrial Radio Access (E-UTRA); Physical layer procedures (Release 8), V8.2.0, 3GPP Organizational Partners, Valbonne, France, Mar. 2008, 30 pages.

(Continued)

*Primary Examiner* — Inder P Mehra
(74) *Attorney, Agent, or Firm* — NDWE LLP

(57) ABSTRACT

Uplink traffic control device, method and computer program product to determine that predictive scheduling is to be applied for the mobile station. Thereafter an uplink transmission scheme is determined for the predictive scheduling. Thereafter, periodic messages comprising uplink transmission grants, according to the uplink transmission scheme, are sent to the mobile station, the messages further comprising a request for a downlink channel quality indicator (CQI) report.

15 Claims, 9 Drawing Sheets

Related U.S. Application Data continuation of application No. 15/193,002, filed on Jun. 24, 2016, now Pat. No. 10,064,207, which is a continuation of application No. 14/360,592, filed as application No. PCT/SE2011/051491 on Dec. 9, 2011, now Pat. No. 9,380,603.

(51) Int. Cl.
  *H04W 74/04* (2009.01)
  *H04W 76/28* (2018.01)
  *H04W 84/04* (2009.01)
  *H04L 5/00* (2006.01)

(52) U.S. Cl.
  CPC ....... *H04L 5/0057* (2013.01); *H04W 72/1252* (2013.01); *H04W 76/28* (2018.02); *H04W 84/042* (2013.01)

(58) Field of Classification Search
  CPC .... H04L 67/325; H04L 5/0057; H04W 4/028; H04W 52/30; H04W 72/02; H04W 72/1226; H04W 72/1252; H04W 72/14; H04W 74/04
  USPC ...... 455/450, 453, 456.2, 427, 452.1, 562.1; 370/336
  See application file for complete search history.

(56) References Cited

U.S. PATENT DOCUMENTS

| | | | |
|---|---|---|---|
| 2008/0080465 A1 | 4/2008 | Pajukoski et al. | |
| 2008/0316959 A1 | 12/2008 | Bachl et al. | |
| 2009/0163199 A1 | 6/2009 | Kazmi et al. | |
| 2009/0191882 A1 | 7/2009 | Kovacs et al. | |
| 2010/0113057 A1 | 5/2010 | Englund et al. | |
| 2010/0177721 A1* | 7/2010 | Simonsson | H04J 11/005 370/329 |
| 2011/0321050 A1* | 12/2011 | Ho | H04W 4/08 718/102 |
| 2012/0044880 A1* | 2/2012 | Sun | H04W 72/1242 370/329 |
| 2012/0069793 A1 | 3/2012 | Chung et al. | |
| 2012/0113915 A1 | 5/2012 | Chen et al. | |
| 2012/0195284 A1 | 8/2012 | Mann et al. | |
| 2012/0207040 A1* | 8/2012 | Comsa | H04W 72/1215 370/252 |
| 2012/0243591 A1 | 9/2012 | Park et al. | |
| 2013/0223266 A1 | 8/2013 | Goto et al. | |
| 2013/0279445 A1 | 10/2013 | Moulsley et al. | |
| 2013/0301422 A1 | 11/2013 | Caretti et al. | |
| 2014/0016586 A1 | 1/2014 | Khan et al. | |
| 2014/0135027 A1 | 5/2014 | Kodali et al. | |
| 2014/0198765 A1 | 7/2014 | Krishnamurthy et al. | |
| 2018/0330062 A1 | 11/2018 | Balaban et al. | |

FOREIGN PATENT DOCUMENTS

| | | |
|---|---|---|
| WO | 2010120870 A2 | 10/2010 |
| WO | 2011025427 A1 | 3/2011 |
| WO | 2012148331 A1 | 11/2012 |

OTHER PUBLICATIONS

Coskun A.K., "Efficient Thermal Management for Multiprocessor Systems," University of California, San Diego, 2009, 131 pages.
European Search Report for Application No. PCT/SE2011/051491, dated May 12, 2015, 7 pages.
Extended European Search Report for EP Application No. 16172657.5, dated Feb. 7, 2017, 9 pages.
International Search Report for Application No. PCT/SE2011/051491, dated Dec. 17, 2012, 4 pages.
Kumar N P., et al., "Thermal Aware Processor Operation Point Management," IEEE/ACM Fifth International Conference on Utility and Cloud Computing, 2012, 8 pages.
LTE; Evolved Universal Terrestrial Radio Access (E-UTRA); Physical channels and modulation, ETSI TS 136 211, V10.3.0, Oct. 2011, 105 pages.
Shenzhen C., "Effect of false positive Semi-Persistent grants," 3GPP TSG-RAN WG2 #61bis, Mar. 31-Apr. 4, 2008, 2 pages.
European search report, EP. App. No. 19163763.6, dated Oct. 22, 2019, 6 pages.
International Preliminary Report on Patentability for Application No. PCT/SE2011/051491, dated Jun. 19, 2014, 10 pages.
Communication under Rule 71(3) EPC for EP Application No. 11876929.8, dated Feb. 18, 2016, 82 pages.
Decision to grant a European patent pursuant to Article 97(1) EPC for EP Application No. 11876929.8, dated May 12, 2016, 2 pages.
Communication under Rule 71(3) EPC for EP Application No. 16172657.5, dated Dec. 13, 2018, 79 pages.
Decision to grant a European patent pursuant to Article 97(1) EPC for EP Application No. 16172657.5, dated Feb. 28, 2019, 2 pages.
Communication under Rule 71(3) EPC, EP App. No. 19163763.6, Oct. 20, 2020, 79 pages.

* cited by examiner

SCHEDULING OF DELAY-SENSITIVE TRAFFIC

CROSS-REFERENCE TO RELATED APPLICATIONS

This application is a continuation of U.S. application Ser. No. 16/044,468, filed Jul. 24, 2018, which is a continuation of U.S. application Ser. No. 15/193,002, filed Jun. 24, 2016, issued as U.S. Pat. No. 10,064,207 on Aug. 28, 2018, which is a continuation of U.S. application Ser. No. 14/360,592, filed May 23, 2014, issued as U.S. Pat. No. 9,380,603 on Jun. 28, 2016, which is the National stage of International Application No. PCT/SE2011/051491, filed Dec. 9, 2011, which are all hereby incorporated by reference.

TECHNICAL FIELD

The present disclosure relates to predictive scheduling in wireless communication networks.

BACKGROUND

In the 3rd Generation Partnership Project (3GPP) standardization body technologies like Global System for Mobile Communication (GSM), High-Speed Packet Access (HSPA) and Long Term Evolution (LTE) have been and are currently developed.

LTE is the latest technology standardised. It uses an access technology based on OFDM (Orthogonal Frequency Division Multiplexing) for the downlink (DL) and Single Carrier FDMA (SC-FDMA) for the uplink (UL). The resource allocation to mobile stations, in LTE denoted user equipment (UE), on both DL and UL is performed adaptively by the concept of fast scheduling, taking into account the instantaneous traffic pattern and radio propagation characteristics of each mobile station. Assigning resources in both DL and UL is performed in a so-called scheduler situated in a base station, in LTE often denoted eNodeB.

In e.g. LTE, uplink transmissions are scheduled by a base station. A grant is transmitted on the downlink control channel PDCCH and the mobile station responds with a transmission using the resources specified in the grant and with the size specified in the grant. The mobile station can let the base station know that it wants to transmit by sending a scheduling request (SR) on the uplink control channel PUCCH at predefined times. Typically, the mobile station transmits an SR which is followed by one or many grants, each resulting in one uplink transmission. This is commonly referred to as dynamic scheduling.

With the higher speeds a number of various applications that a user of the mobile station can be engaged in have evolved. It is for instance of interest for a user to involve him- or herself in online games, where small amounts of uplink data are transferred fairly often from the mobile station to another device involved in a game. Here the transferred data may be gaming commands and the other device may be another mobile station or another type of user terminal like a PC or even a server. Gaming is one example of delay-sensitive traffic. The increase of this delay-sensitive traffic and its significant share in the internet traffic leads to the radio interfaces of wireless communication systems having to meet various latency requirements to ensure that a mobile station user can enjoy the activities employing this type of traffic. Another example of delay-sensitive traffic is ping. Ping is for instance used to estimate the delay of a channel as well as to measure the performance in radio systems in order to for instance compare and/or rank different systems.

Setting up of traffic in a wireless communication network is often referred as allocation of resources. When resources are allocated to a mobile station desiring to send data in the uplink, there are normally a number of activities that have to be performed. First the mobile station sends a scheduling request (SR). This is followed by the base station responding with a grant, which grant includes information on what time/frequency resources the mobile station shall use. The mobile station then transfers a Buffer Status Report (BSR) after which the base station issues a grant for further data. It is not until it receives this further grant that the mobile station can transmit the actual data it intends. This process is time consuming, especially if the mobile station is to run through the process each time it desires to transfer data.

It is not required that an SR precedes the grant. When the base station knows that a mobile has a periodic service or for some other reason can predict future data arrivals it can transmit a grant to the mobile without waiting for an SR. It is also possible to blindly transmit grants in order to speed up the scheduling. These scheduling methods are called predictive scheduling.

However, predictive scheduling may cause so called padding transmissions from a mobile station if the mobile does not have data in the buffer. Padding transmissions are messages containing no relevant information, and should thus be avoided as much as possible.

There is in view of what has been described above a need for avoiding the sending of transmissions comprising only padding for a mobile station provided with predictive scheduling.

SUMMARY

One object of the present disclosure is therefore directed towards avoiding the sending of transmissions comprising only padding for a mobile station provided with predictive scheduling.

The above mentioned object is according to a first aspect achieved through a method performed in a node of a wireless communication network comprising a mobile station and a base station. The method comprises determining that predictive scheduling is to be applied for the mobile station, whereby an uplink transmission scheme is determined for the predictive scheduling. Thereafter periodic messages comprising uplink transmission grants, according to the uplink transmission scheme, are sent to the mobile station, said messages further comprising a request for a downlink channel quality indicator, CQI, report.

The above mentioned object is according to a second aspect achieved by an uplink traffic control device in a wireless communication network comprising a mobile station and a base station. The uplink traffic control device comprises an uplink scheme determining unit configured to determine that predictive scheduling is to be applied for the mobile station and to determine an uplink transmission scheme for the predictive scheduling. The uplink traffic control device further comprises a transmission control unit configured to send periodic messages comprising uplink transmission grants, according to the uplink transmission scheme, to the mobile station, said periodic messages further comprising a request for a downlink channel quality indicator, CQI.

The above mentioned object is according to a third aspect also achieved through a computer program for use in a wireless communication network comprising a mobile station and a base station. The computer program product comprises a computer readable storage medium comprising computer program code causing an uplink scheme determining module of an uplink traffic control device to:

determine that predictive scheduling is to be applied for the mobile station determine an uplink transmission scheme for the predictive scheduling, and send periodic messages comprising uplink transmission grants, according to the uplink transmission scheme, to the mobile station, said messages further comprising a request for a downlink channel quality indicator, CQI, report.

The above mentioned aspects enables the predictive scheduling transmissions from the mobile station to comprise useful information, since the mobile station is requested to send a CQI report upon receipt of the uplink transmission grant. This means that uplink transmissions generated in response to the predictive scheduling will at least comprise a CQI report and thus these uplink transmissions will not only comprise padding.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present disclosure will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the solution according to the present disclosure may be practiced in other embodiments that depart from these specific details. In other instances, detailed descriptions of well-known devices, circuits and methods are omitted so as not to obscure the description of the invention with unnecessary detail.

Parts of the disclosure is generally directed towards reducing the padding transmissions from a mobile station when provided with predictive scheduling, e.g. when involved in delay-sensitive activities such as on-line gaming or ping.

Figure 1:
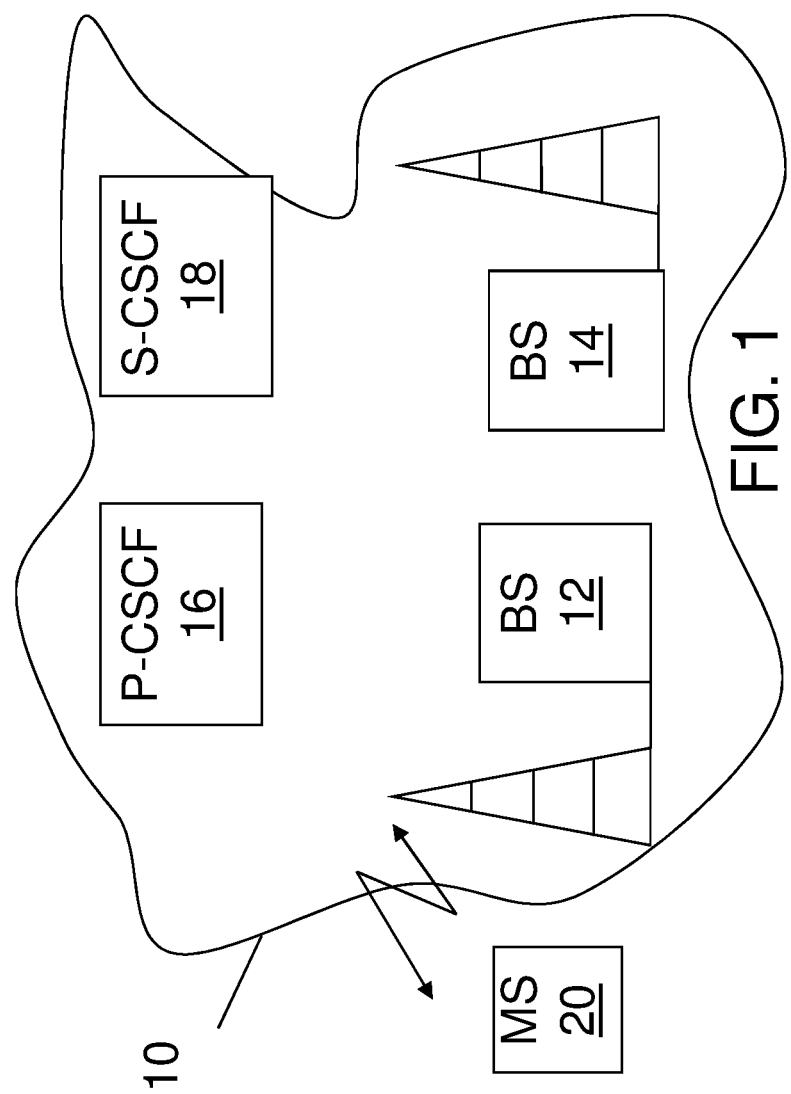
FIG. 1 schematically shows a mobile station communicating with a first base station in a wireless communication network, where the network also comprises a second base station and two further nodes.

A non-limiting example context of a wireless communication network 10 will now be described in more with reference to FIG. 1. The wireless communication network 10 may here be a cellular network such as a Universal Mobile Telecommunications System (UMTS) network or a Long Term Evolution (LTE) network. These are merely some examples of some types of networks in which the invention may be implemented. Several other types of networks exist.

To the network 10 there is connected a mobile station 10 being associated with a user. Here the mobile station may be a phone, such as mobile phone or a computer like a lap top computer or a palm top computer. These are just a few examples of mobile stations that can be used. A mobile station is in LTE often denoted User Equipment (UE).

The mobile station 20 is more particularly communicating with a first base station BS 12. The first base station 12 is here one network node. The system also includes a number of other network nodes, where as an example a second base station BS 14 is shown as well as two more central nodes, a Proxy Call Session Control Function P-CSCF server 16 and a Serving Call Session Control Function S-CSCF 18. These latter nodes are nodes at a higher hierarchical level of the system than the base stations. For this reason, the base stations 12 and 14 are often described as being provided in an access network of the wireless communication network, while the servers 16 and 18 are described as provided in a core network of the wireless communication network.

Figure 2:
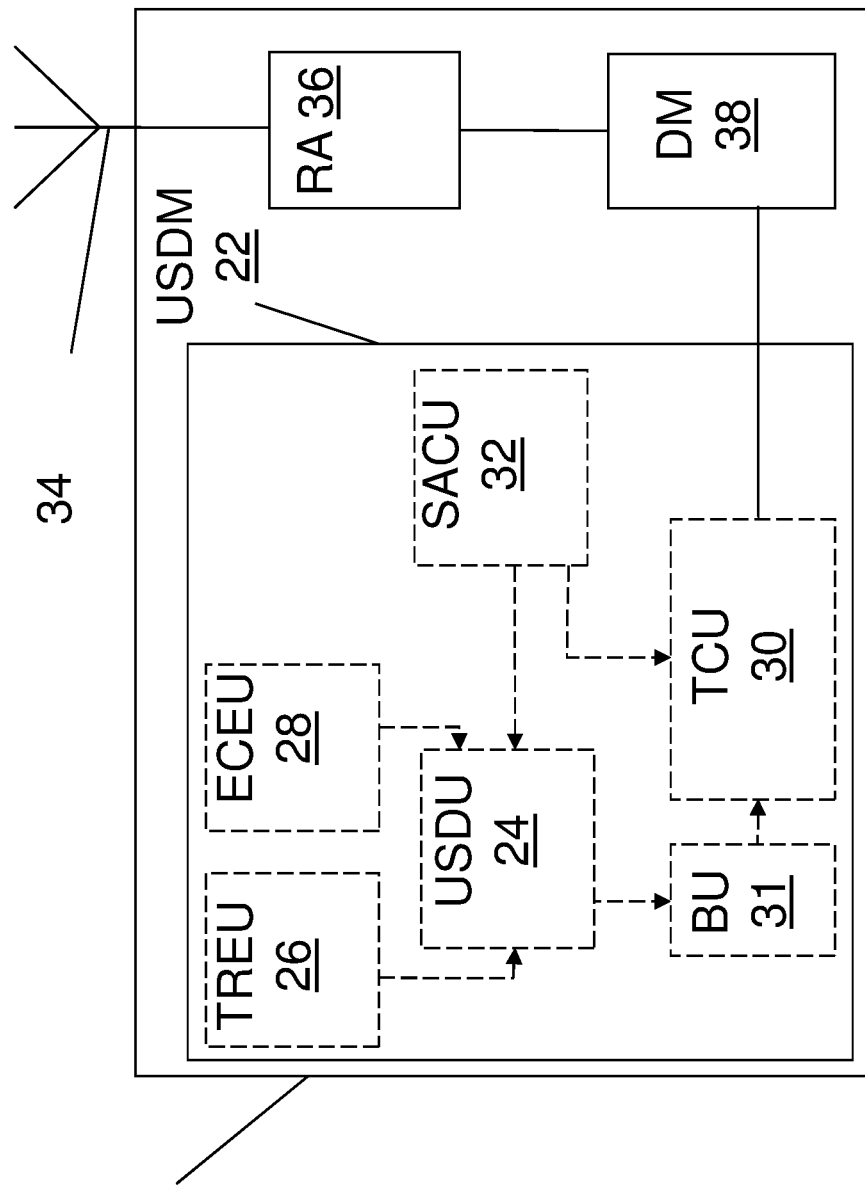
FIG. 2 shows a simplified block schematic of an uplink traffic control device.

FIG. 2 shows a block schematic of an uplink traffic control device 21. In one variation this traffic control device 21 is the first base station. However, it should be realized that it may as an alternative be provided as another network node. If for instance the wireless communication network is an UMTS network, then the device can be provided as a radio network controller (RNC). As yet another alternative, it is possible that the device 21 is provided in a node on a higher hierarchical level, such as in a server in the core network, for instance the S-CSCF 18.

The uplink traffic control device 21 does in this example comprise at least one antenna 34 and here only one antenna is shown, which antenna is connected to a radio circuit RA 36. A data modulator DM 38 is in turn connected to the radio circuit 36. The uplink traffic control device 21 also comprises an uplink scheme determining module USDM 22. The uplink scheme determining module 22 in turn comprises a number of units. It comprises a transmission control unit TCU 30, which is connected to the data modulator 38. The transmission control unit TCU 30 is connected to a scheme application control unit SACU 32 and to an input buffer 31, which buffer 31 is also connected to an uplink scheme determining unit USDU 24. The uplink scheme determining unit 24 is in turn connected to a transmission requirement estimating unit TREU 26, to an energy consumption estimating unit ECEU 28 and to the scheme application control unit 32. The transmission control unit TCU 30 is in this example a so-called scheduler, which is responsible for scheduling uplink data in the time and/or frequency domain for a number of mobile stations being connected to the communication network via the uplink traffic control device.

In LTE the downlink will support channel dependent scheduling in both the time and frequency domains. The radio base station will transmit reference signals that the mobile stations use to determine the downlink channel quality. The mobile stations will send Channel Quality Indication (CQI) reports back to the base station that are used by a scheduler located in the base station for scheduling traffic within the cell that the base station serves.

In the LTE network the mobile station is specified to be able to transmit different types of CQI reports. For example, the mobile will have the capability to transmit full CQI reports and partial CQI reports. Full CQI report covers the whole downlink transmission bandwidth but they may have different frequency resolution. The CQI reports may be filtered and processed in different ways, and they may be encoded in different ways, see also 3GPP TS 36.213 V8.2.0. "Physical layer procedures".

The mobile station 20 is typically equipped with an uplink buffer and when there is data in this buffer needed to be transmitted, the mobile station transmits a scheduling request SR to the wireless communication network 10 and more particularly to the first base station 12. Such a scheduling request is in LTE typically transmitted on a dedicated SR channel (D-SR) or on a contention based Random Access Channel (RA-SR). A D-SR requires that the mobile station is synchronized in the uplink (UL) and that the mobile station has been assigned an SR channel on the Physical Uplink Control Channel (PUCCH).

In predictive scheduling a mobile station receives transmission grants without actual knowledge of the mobile station buffer content.

The data transmission requirements of the mobile station can then be estimated. It is here possible to monitor the behaviour of the mobile station and use obtained statistics to control the amount of data and the periodicity of the data that the base station is to receive from the mobile station.

Figure 3:
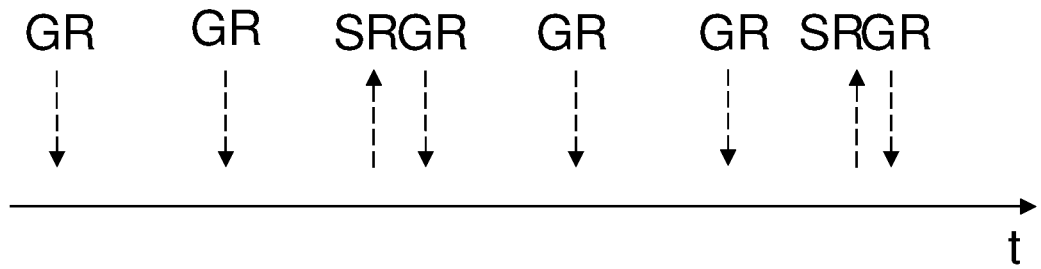
FIG. 3 schematically shows scheduling requests sent by the mobile station to the first base station together with grants sent as responses as well as additional grants.

FIG. 3 schematically shows how a mobile station sends scheduling requests regularly and also how grants are provided as responses to such scheduling requests. These scheduling requests SR may as an example be repeated every 10-20 ms. It should be realized that in relation to a scheduling request SR all the signals shown in FIG. 3 are in fact being sent. However, only one grant GR is shown in order to simplify the figure.

There is thus considerable delay in case the mobile station 20 and base station 12 are to go through all the above-mentioned steps each time the mobile station 20 is about to send data. In order to simplify the situation and lower the delay, the present disclosure proposes that the uplink traffic control device ensures that some grants are sent despite non-receipt of scheduling requests. This means that the present disclosure proposes that the uplink traffic control device 21, which in a first variation of the invention is the above described first base station 12, ensures that grants are sent without in fact knowing that the mobile station has data in its output buffer intended for the wireless communication system 10 and that the transmission comprise useful information in form of a CQI report.

How this can be done according to a first embodiment will now be described with reference being made to FIGS. 1, 2 and 4, which latter figure shows a flow chart of a number of method steps in a general method for scheduling uplink traffic according to a first embodiment.

The method, which is performed in the network node comprising the uplink traffic control device 21, starts with the uplink scheme determining unit 24, determining that predictive scheduling, step 40, is to be applied for the mobile station. The reasons are depending on a received service indicator associated with or concerning the mobile station 20 and/or operator preconfigured parameter to use predicted scheduling. Depending on the situation within a cell, an operator can based on such a parameter determine to apply predictive scheduling for certain users or mobile stations. A service indicator associated with or concerning the mobile station 20 may be a Quality of Service parameter like the parameter Quality Class Indicator (QCI) used in LTE. It is an indicator that identifies a type of data traffic that the mobile station wants to send in the uplink or receives in downlink. This indicator may be obtained by the uplink scheme determining unit 24 from the mobile station 20. As an alternative it is possible that it is obtained from another network node, for instance from a server in the core network, such as the S-CSCF 18 or P-CSCF 16. This indicator also provides a priority setting of the communication of the mobile station in relation to a communication session in which the mobile station or rather the user of the mobile station wishes to engage, which session would then involve delay sensitive traffic such as communication in an on-line gaming session or a ping.

The uplink scheme determining unit 24 then determines, step 42, an uplink transmission scheme of the mobile station 20. The scheme is preferably determined based on the service type indicator or the operator preconfigured parameter, i.e. based on the reason for applying predictive scheduling. For a mobile station for which it has been decided to apply predictive scheduling, the predictive scheduling can be initiated, i.e. started (or re-started in case it has been previously stopped) with the purpose of reducing the delay of uplink or/and downlink data transmission. Example of uplink initiated predictive scheduling are receipt of data from a mobile station wherein the buffer status report indicates an empty buffer and/or an indication that a channel quality metric such as path loss is within a certain interval or below a threshold. Examples of downlink initiated predictive scheduling are detecting that a channel quality metric such as path loss is within a certain interval or above a threshold, and/or an indication that there is data in the downlink buffer. It could also be decided to blindly transmit scheduling grants, i.e. apply predictive scheduling by e.g. a policy decision, thus not being downlink or uplink initiated.

The uplink transmission scheme comprises in this situation an interval between sending of consecutive periodic messages comprising an uplink transmission grant for the mobile station. The interval being dependent on the reason for determining that predictive scheduling is to be applied. The uplink scheme determining unit 24 prepares a message comprising an uplink transmission grant and a request for a downlink CQI report. A more detailed description of how the message is prepared will be later described with reference to FIG. 5. The determination according to step 42 may involve estimating the size of data to be transmitted and the frequency with which the data is to be transmitted by the mobile station. This estimation may be performed through considering also other data such as what data sizes and how frequently data with these sizes have previously been used in earlier sessions involving e.g. delay-sensitive traffic. The scheme may also be adapted according to channel quality, for example average path gain for the mobile, or average gain to interference plus noise ratio (GINR) in the uplink traffic control device 21 to obtain a good tradeoff between end user delay and mobile station battery drain. A mobile with good channel quality will be scheduled with shorter interval between sending of grants, whereas a mobile with poorer channel quality will be scheduled with a longer interval. The tradeoff between scheduling latency and battery consumption is well achieved by adapting the periodicity with the channel quality. This will be further described with reference to FIG. 10.

It is here also possible to consider the frequency with which scheduling requests and BSRs have been sent as well as earlier content of these in relation to earlier communication sessions of the same type. In this way an uplink transmission scheme specifies the periodicity of the uplink transmissions as well as the data size. The scheme is furthermore determined in advance of the actual uplink grants being given. The scheme is thus pre-determined before grants are being sent. Thus, the scheme may initially be provided before the mobile station sends a scheduling request.

Thereafter the uplink scheme determining unit 24 informs the transmission control unit 30 of the scheme, which transmission control unit 30 goes on and periodically grants transmissions to be made from the mobile station 20 according to the scheme, step 44. This may involve the transmission control unit 30 issuing grants GR to transmissions, which are being issued using the data modulator 38, radio circuit 36 and antenna 34. Here the uplink scheme determining unit may employ the buffer 31 for informing the transmission control unit 30. However, it should be realized that it is also possible with a direct command being issued. The use of the buffer will be described in more detail with reference to FIG. 6. The scheme may also make room for requested grants, i.e. for grants sent as a result of a received schedule request SR or BSR. If the grant for further data sent after receiving such a request from the mobile station coincides with a grant according to the scheme, the grant according to the scheme may be held back.

In step 45 the node receives, in step 45, transmissions sent from the mobile station. The transmissions from the mobile station are sent in response to the uplink transmission grants sent from the node in step 44. Each of the transmissions sent in response to the predictive scheduling uplink transmission grants comprises a downlink channel CQI report. The information in the CQI report will be used by the node in order to provide channel estimation for downlink transmission.

In this way it is possible to grant transmissions in addition to those for which the mobile station issues a scheduling request SR. As can for instance be seen in FIG. 3, the uplink traffic control device 21 issues several additional grants GR in addition to the grants GR issued after a scheduling requests SR. These additional grants speed up mobile station transmissions to the wireless communication network.

Figure 5:
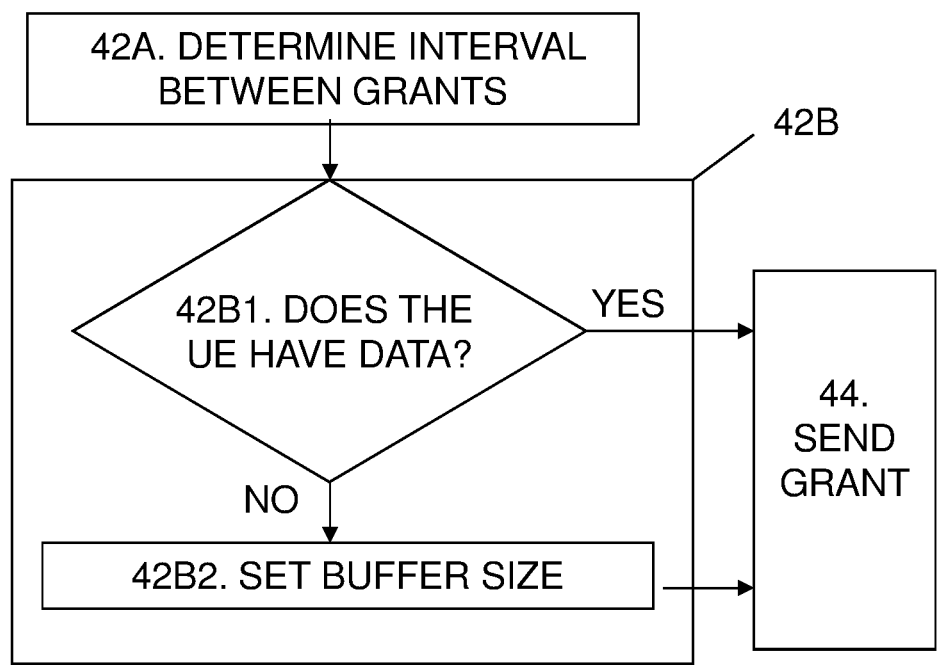
FIG. 5 schematically shows a flow chart of method steps for preparing uplink transmission grants.

FIG. 5 shows a flow chart that in more detail describes the determination of the uplink transmission scheme and the preparation of the messages comprising the uplink transmission grant and the CQI report request. In step 42A the reason for applying predictive scheduling to the mobile station is established by the USDU 24. Based on the reason for applying predictive scheduling an interval between sending of consecutive periodic messages comprising an uplink transmission grant for the mobile station is determined. Further, based on the reason for applying predictive scheduling the amount of data that the mobile station is allowed to transmit may be determined.

In step 42B, the message comprising the uplink transmission grant and a request for a downlink CQI report that is to be sent to the mobile station is prepared by the USDU 24. Step 42B further comprises the sub-step 42B1 in which it is determined whether the mobile station has data to transmit or not. If the mobile station has data to transmit, the message is provided with information regarding the transport block size that the scheduling entity, i.e. the mobile station, is requested in the current Transmission Time Interval. The actual resource allocation, i.e. the amount of allowed transmission data for the scheduling entity, is decided by the uplink traffic control device based on e.g. a priority weight associated with the entity. A mobile station with non-zero buffer size has a weight of the correspondent uplink data plus an extra CQI report weight. Thereafter the method moves on to step 44 according to alternative "Yes". In step 44 the message comprising the UL transmission grant including resource allocation and the CQI report request is sent to the mobile station.

If it in step 42B1 was determined that the mobile station does not have data to transmit, i.e. the buffer status report indicates an empty buffer, the method moves on to step 42B2, and the buffer 31, according to alternative "No". In case the uplink traffic control device 21 does not have information regarding the whether the mobile station has data to transmit or not, the method also moves on to step 42B2 according to alternative "No". The uplink scheme determining unit 24 provides an internal special queue of artificial data in the buffer 31 dedicated to the mobile station 20. This low-priority queue is provided for the delay-sensitive data associated with the mobile station 20. Since it is fed with artificial data, the low priority queue will match the delay-sensitive data. The rate at which this buffer 31 is filled, i.e. the rate with which data is placed, and the amount with which it is filled causes the transmission control unit to periodically transmit grants to the mobile station 20 according to the scheme. In step 42B2 the message is provided with artificial data having an arbitrary size. The value of the arbitrary size of the artificial data can be a parameter set by an operator. The value of arbitrary size should be large enough to accommodate a packet size of the traffic, which is subject to be delay optimized, plus the overheads added in different layers and a buffer status report. The priority weight associated with a mobile station with zero buffer size has a weight of only the CQI request weight, which is of much lower priority than the normal uplink traffic data. Thereafter the method moves on to step 44. In step 44 the message comprising the UL transmission grant including resource allocation and the CQI report request is sent to the mobile station.

Figure 4:
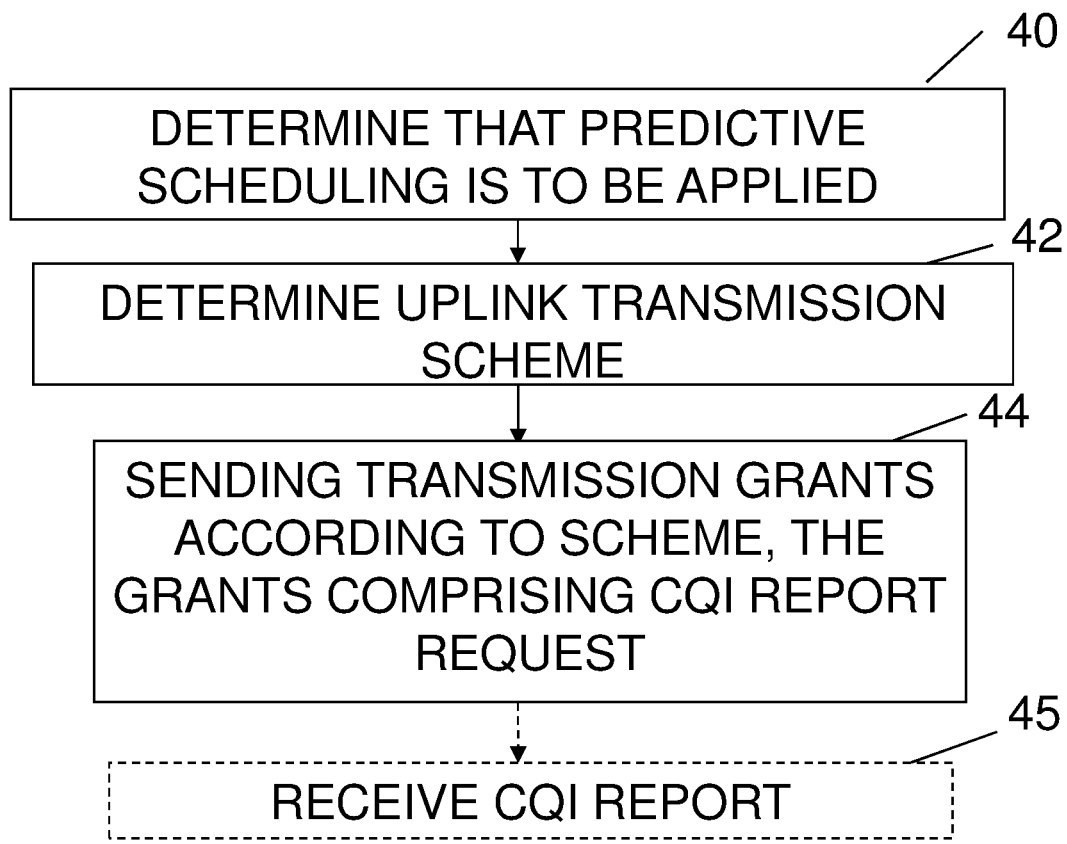
FIG. 4 shows a flow chart of a number of method steps in a general method for scheduling uplink traffic according to an embodiment.

The effect of implementing a scheme, as described with reference to FIGS. 4 and 5, is that the mobile station subject to predictive scheduling will receive scheduling grants when possible without having any impact on the performance for other scheduling entities. This means that in a low load situation, when there are free resources in time and frequency, the predictive scheduling will order a-periodic CQI report requests that will be sent to the mobile station in the form of predictive scheduling uplink transmission grants comprising a downlink CQI report request. In a high load situation, however, the CQI scheduling entity will not be scheduled since data from normal priority queues of other mobile stations will be prioritized.

Commonly, an a-periodic CQI report is only requested by a downlink scheduler and a pre-scheduling grant only triggers a normal uplink transmission, the method according to the present disclosure combines those mechanisms by applying a predictive scheduling scheme to schedule an a-periodic CQI report. With this method, not only the uplink scheduling delay is improved due to the predictive scheduling, but also downlink CQI report is sent more frequently. As a result, fewer transmissions are wasted since no padding transmissions are sent and more frequent downlink channel quality updates becomes possible.

Figure 6:
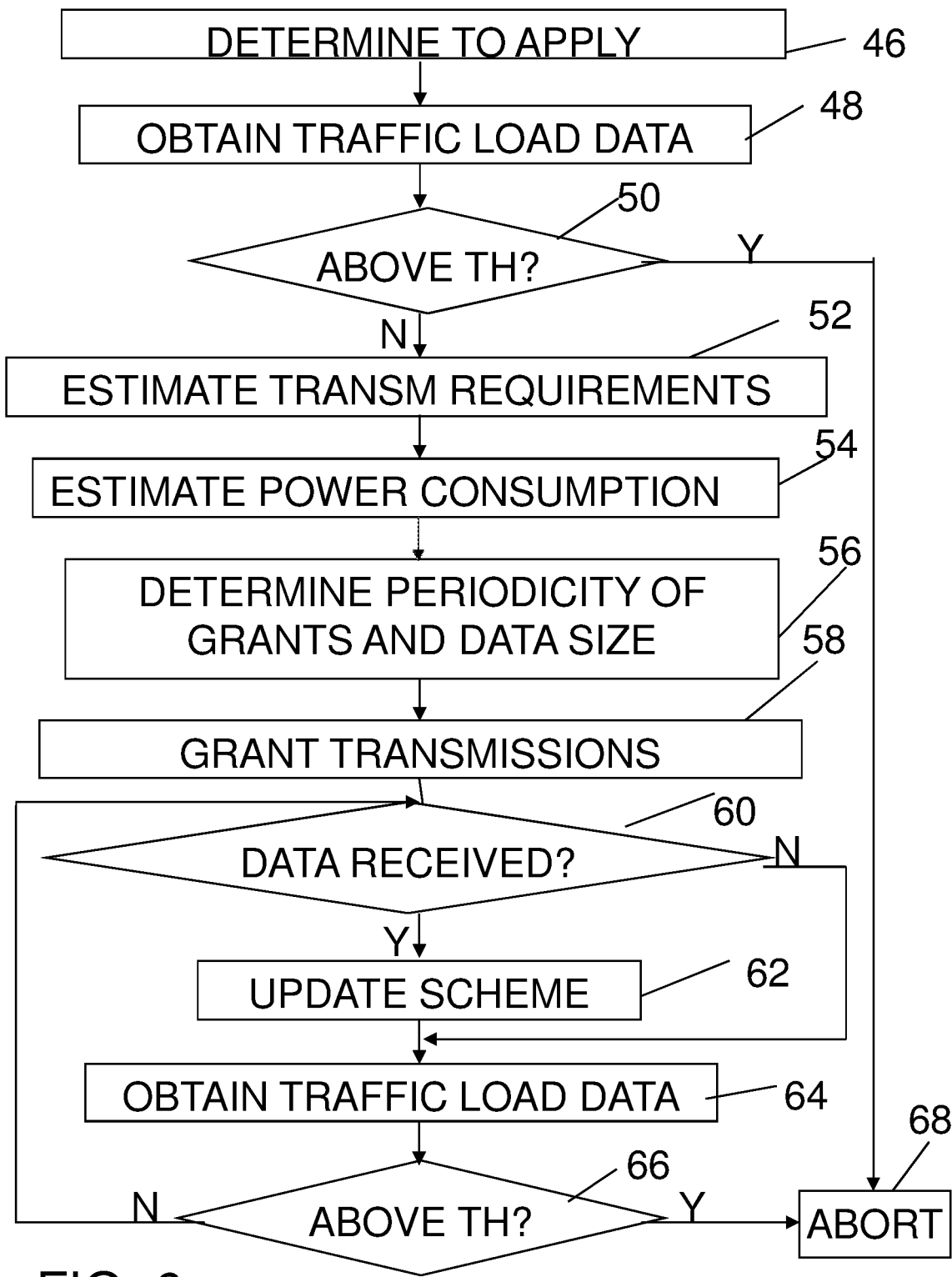
FIG. 6 schematically shows a flow chart of a number of method steps in a method for scheduling uplink traffic according to an embodiment.

Now a more specific embodiment will be described with reference being made to FIG. 6, which shows a flow chart of a number of method steps in a method for scheduling uplink traffic according to the second embodiment.

As in the first embodiment the method starts with the uplink scheme determining unit 24 determining that predictive scheduling shall be applied, step 46. Based on the reason for the determination, e.g. an obtained service type indicator, the quality of service associated with the type of communication the mobile station 20 is to be engaged in the desired communication session can be decided. From this decision it is then possible to estimate the data transmission requirements of the mobile station 20.

As this is done, the scheme application control unit 32 at the same time obtains traffic load data concerning the traffic load in the wireless communication system, step 48. This data may be data received from a central node, such as the P-CSCF or the S-CSCF. Such data is then received via a transport network interface (not shown). It may also be local traffic load data received from the transmission control unit 30 based on the scheduling of other traffic, typically associated with other mobile stations. The traffic load data may here furthermore include data of traffic having a higher priority as well as pre-existing traffic of the same priority. The traffic control unit 30 will typically obtain such data in the course of resource allocation via the antenna 34 and radio communication unit 36. The traffic load obtained via the traffic load data is then compared, by the scheme application control unit, 32, with a corresponding traffic load threshold. If the traffic load is above the threshold, step 50, then the scheme application control unit 32 aborts the uplink scheduling, step 68, which may at this stage involve instructing the uplink scheme determining unit 24 to stop determining an uplink schedule. It may also involve instructing the transmission control unit 30 to disallow any scheduling of traffic from the uplink scheme determining unit 24. If however the traffic load is below the threshold, step 50, the uplink scheme determining unit 24 is allowed to continue.

Thereafter, the uplink scheme determining unit 24 may instruct the transmission requirement estimating unit 26 to estimate transmission requirements and may also instruct the energy consumption estimating unit 28 to estimate the battery consumption of the mobile station. The transmission requirement estimating unit 26 may then estimate the transmission requirements of the mobile station 20, step 52. This may be done through investigating the service type indicator, which defines the kind of service requested. The indication therefore gives a hint about the requirements of the mobile station 20. The indicator may also provide an initialisation value of the amount of data required. The transmission requirement estimating unit 26 may also consider statistical data regarding the behaviour of the mobile station 20, such as periodicity and data amounts in previous sessions of the same and/or different types. It is here also possible to consider the fact if there is any downlink data intended for the mobile station in the session in question. At the same time the energy consumption estimating unit 28 may estimate the battery consumption of the mobile station, step 54. This may be based on a model of the energy consumption, the estimated transmission requirements and an estimation of the length of the session. This session length estimation may consider the length of previous sessions of the same type. In the battery consumption estimation, it is furthermore possible to also consider the statistical general behaviour of the mobile station, such as the frequency and length of other types of communication sessions. It may also consider downlink data intended for the mobile station 20.

These estimations are then sent to the uplink scheme determining unit 24, which goes on and determines the periodicity of grants and data size allowed at each grant, step 56. The determination may thus be based on the estimated transmission requirements and the estimated battery consumption. Typically, the periodicity and size may be determined as a tradeoff between the transmission requirements and battery consumption requirements. When the uplink scheme determining unit 24 has determined a scheme, it then informs the transmission control unit 30 of the scheme and therefore the transmission control unit 30 periodically schedules grants to the mobile station using the data modulator 38, radio circuit 36 and antenna 34.

The informing could be provided through sending a direct instruction to the transmission control unit 30. However, according to the second embodiment another method is used. Here the uplink scheme determining unit 24 provides an internal special queue of artificial data in the buffer 31 dedicated to the mobile station 20. This low-priority queue is provided for the delay-sensitive data associated with the mobile station 20. Since it is fed with artificial data, the low priority queue will match the delay-sensitive data. The rate at which this buffer 31 is filled, i.e. the rate with which data is placed, and the amount with which it is filled causes the transmission control unit to periodically transmit grants to the mobile station 20 according to the scheme.

The transmission control unit 30 may handle a number of ordinary transmission control queues for mobile stations, which queues have higher priority data to be transmitted, such as voice and video data, while the queue in the buffer 31 concerns low priority queue associated with the delay sensitive data of the mobile station 20. The uplink scheme determining unit 24 can therefore be considered to add one extra priority queue, which is set up with a lower priority than the normal queues.

As grants are caused to be transmitted in this way, the uplink scheme determining unit 24 investigates if there is new data received from the mobile station 20, such as SR, BSR or real uplink data sent after receiving a grant, such as number of received bits or a received CQI report. This means that at least some of the received data is received as a response to the granting of transmissions. If there is such data, step 60, it or information of it is provided to the transmission requirement estimating unit 26, which updates the transmission requirements. The update can here be based on the number of bits received. It is also possible to consider if any downlink data is intended for the mobile station 20. The information in a received CQI report will however not affect the scheme but will instead be used for downlink channel estimation. The energy consumption estimating unit 28 may here also update the estimated battery consumption based on this data and the elapsed time. However, it is also possible that the battery consumption is estimated based on other data either instead of or in addition to the received data. In one variation the update of the battery consumption may be made independently of the received data. The base station may for instance measure channel gain updates from other reference signals, such as the sounding reference signal (SRS) in LTE and use for updating the battery consumption estimation. Based on these updated estimations, and thus perhaps based on at least some of the received data, the scheme may thus be updated by the uplink scheme determining unit 24, step 62. If the scheme is updated, the transmission control unit 30 is then informed in a suitable way.

In both cases, both when there is new data that may or may not cause an update of the scheme or if there is no new data, the scheme application control unit 32 continues to obtain traffic load data, step 64, and compare the traffic load with a traffic load threshold, which traffic load data is then especially traffic load having a higher priority than the delay-sensitive data.

If the load is above the threshold, for instance if there is higher priority traffic above the threshold, then the scheme application control unit 32 may inform the transmissions control unit 30 to stop issuing grants according to the scheme. This may be done through a direct command. It may also be done indirectly through emptying the buffer 31 and stopping generation of artificial data and thus through removing the low-priority queue. The scheme application control unit 32 may also inform the uplink scheme determining unit 24 to stop updating the scheme. However, this is not necessarily the case, since it is possible that the additional granting according to the scheme will be resumed if the traffic load again permits it.

In this way it is possible to allow the mobile station to send data without having to request permission in advance, which considerably shortens the delay and will therefore enhance the user enjoyment if being involved in an on-line game.

The delay problem was solved through proactively scheduling a mobile station without actual knowledge of the data it wants to transfer. This was in one embodiment done through employing an internal priority queue in order to make the base station presume that there is low priority traffic data needed to be transmitted in the uplink. A control loop provided by the uplink scheme determining unit then monitors the behaviour of the mobile station statistically to control the amount of data and the periodicity of the data that is assumed to arrive from the mobile station.

The effect of implementing a special priority queue is that the mobile station will get extra opportunities to be scheduled when possible without having any impact on performance for other queues. This means that:

In a low load situation, when there are free resources in time and frequency, e.g. the special priority queue or an a-periodic CQI report request will trigger the transmission control unit to issue periodic grants to the mobile station.

In a higher load situation, the special priority queue and predictive scheduling based a-periodic CQI report will not be scheduled since data from normal priority queues of other mobile stations will be prioritized.

The solution according to the embodiments described above provides a number of further advantages. It will improve the latency situation in a low load scenario in which the radio resources are not fully used. An example of a low load cell can be a pico cell. In such a scenario, parts of the radio resources are likely unused. In this case, it may be a good approach for a base station to give the unused resource to any mobile station which may or may not have data to transmit. If the number of mobile stations is small, there are many unused resources and resources could be granted to a mobile station continuously.

As mentioned above, the sending of the uplink transmission grants triggered by predictive scheduling may increase the power consumption of the mobile station. Therefore, in order to save energy resources in the mobile station, it is proposed to switch the predictive scheduling functionality ON and OFF based on feedback information sent from the mobile station to the uplink traffic control device 21.

Figure 7:
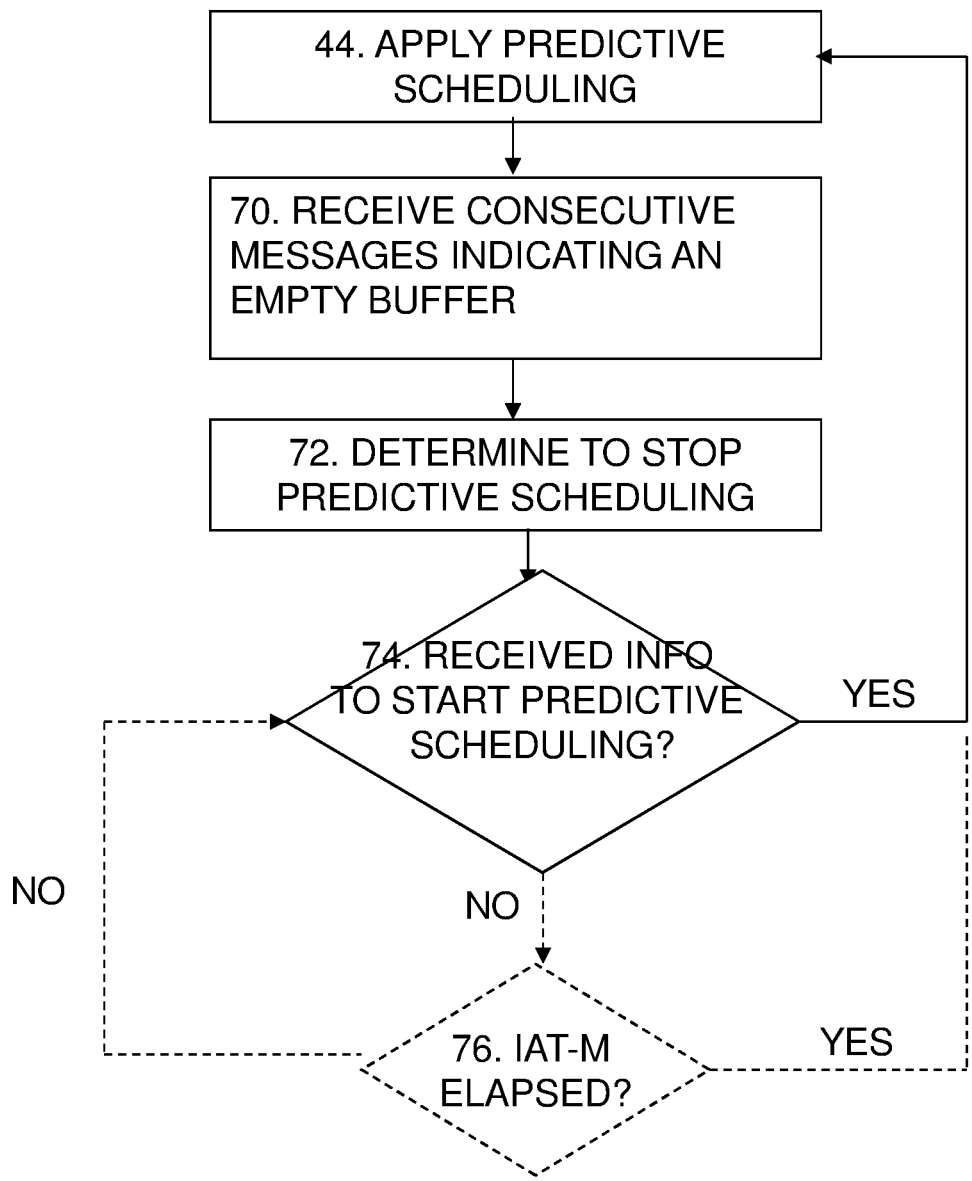
FIG. 7 schematically shows a flow chart of a number of method steps in a method for controlling predictive scheduling.
Figure 8:
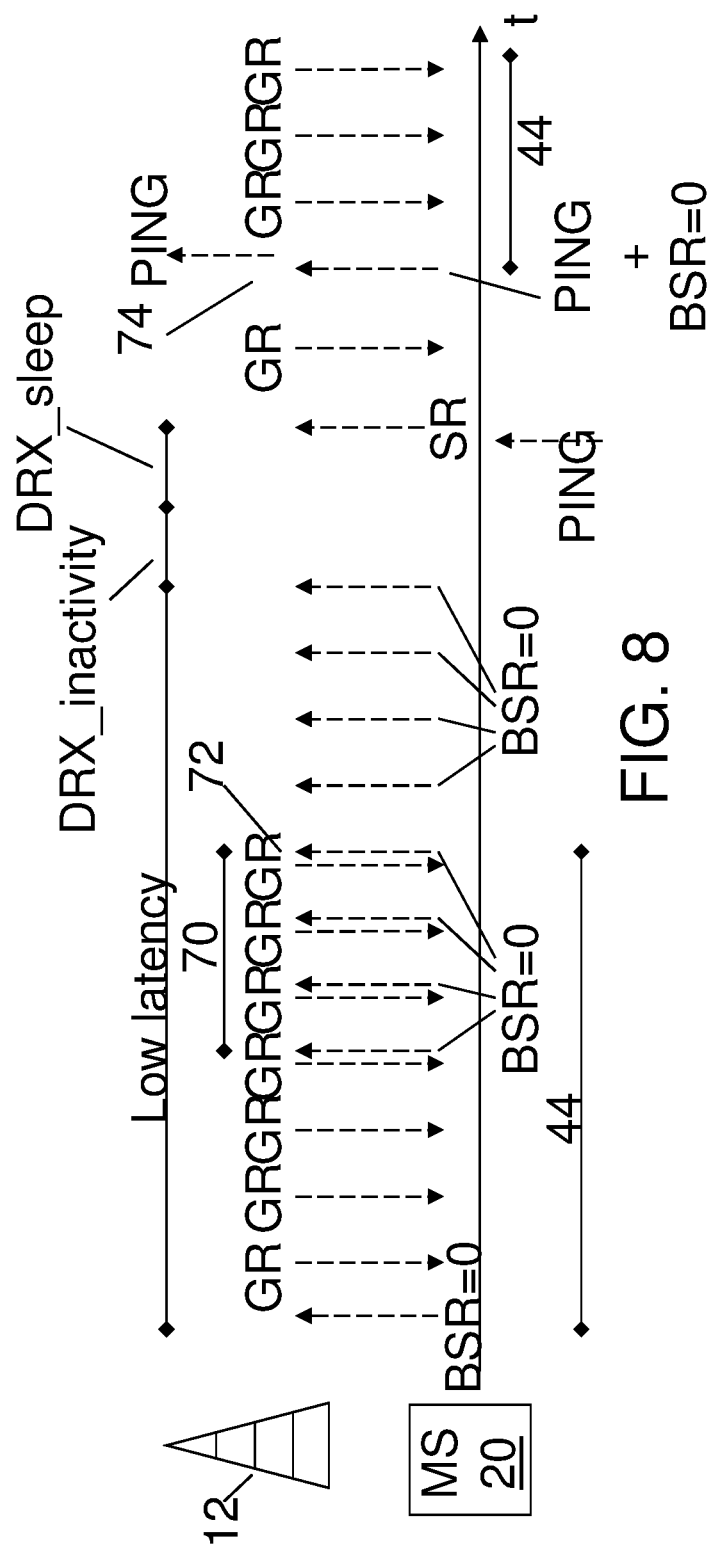
FIGS. 8 and 9 schematically shows the sending of messages between a mobile station and a base station.
Figure 9:
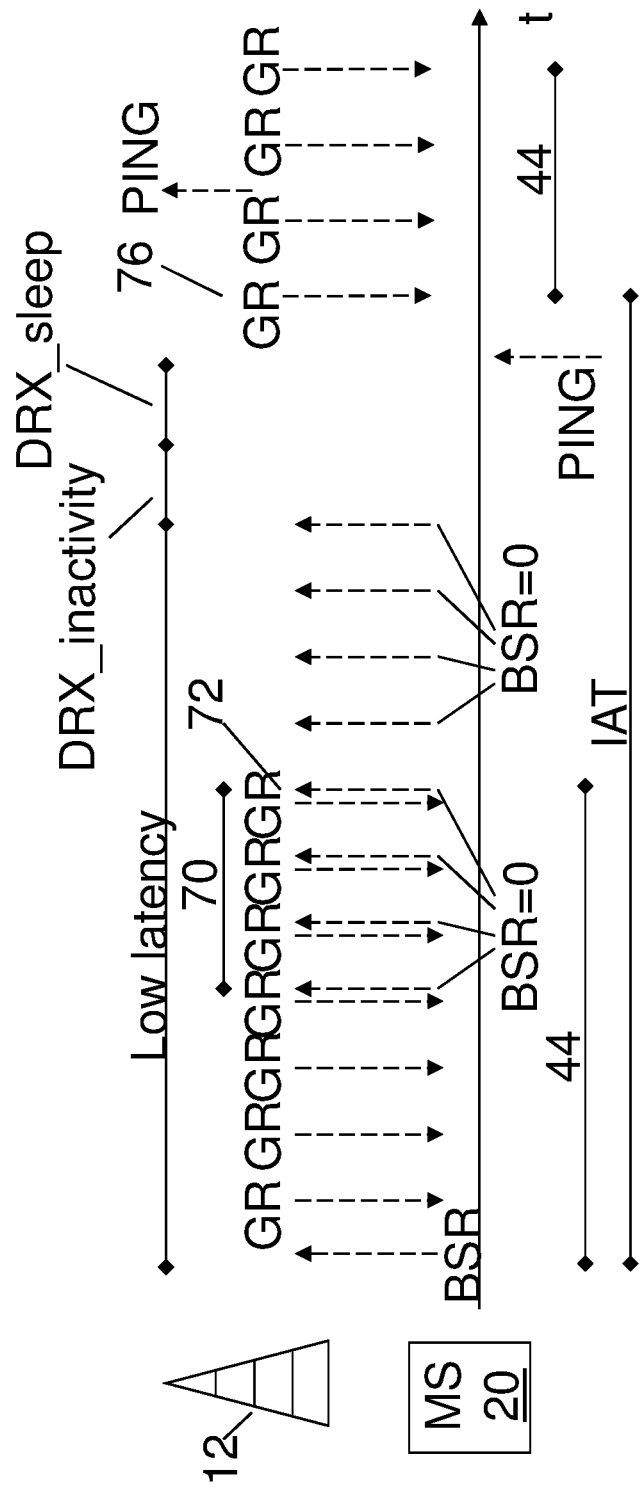

Embodiments describing how the predictive scheduling can be switched on and off depending on information received from the mobile station will now be described with reference to FIGS. 7, 8 and 9. With reference to FIGS. 7-9, the method begins in step 44 with the base station 12 providing uplink transmission grants with a certain periodicity according to an uplink transmission scheme. In the scenario shown in FIG. 8 the decision to apply predictive scheduling was triggered upon receipt of a message from the mobile station 20, the message including a buffer status report indicating a zero buffer size. (see leftmost arrow in FIGS. 8 and 9 indicating the start of the predictive scheduling). After a while, in step 70, the base station 12 starts to receive messages indicating an empty mobile station buffer, i.e. BSR=0. After receiving a number of consecutive messages indicating an empty mobile station buffer it is in step 72 determined to stop applying predictive scheduling to the mobile station 20. In the scenario shown in FIG. 8 the decision to stop applying predictive scheduling was triggered upon receipt of the fourth consecutive message comprising only padding transmissions and buffer status reports that indicate that the mobile station buffer is empty. This is however merely an example and this number could be set arbitrarily or depending on circumstances. A plurality of received consecutive messages indicating an empty mobile station buffer provides an indication that the mobile station will not be sending uplink messages comprising useful information in the near future, whereby the predictive scheduling is stopped. It should also be mentioned that the decision to stop applying predictive scheduling can be based on e.g. obtained traffic load data as described with reference to FIG. 6, or unsuitable channel quality metrics.

After the predictive scheduling has been switched off, the mobile station operates in ordinary mode for a period of time, during which the mobile station is in discontinuous reception (DRX) inactivity mode. DRX is a mechanism that is specified to save power in a mobile station. It allows the station to turn off its receiver and transmitter according to predefined rules while maintaining a connection to the base station. After a further period of time in DRX inactivity mode, the mobile station enters DRX sleep mode. The mobile station is thereafter woken up by a pending scheduling request SR (see FIG. 8). The left arrow marked as PING indicates the arrival of PING data in the buffer of the mobile station. The base station 12 replies by sending a transmission grant to the mobile station scheduling the requested transmission.

A while after the mobile station has finished transmitting data, the base station receives a message from the mobile station comprising data and information that the mobile station buffer is empty (together with a PING) in step 74. This triggers the base station 12 to restart the predictive scheduling and the method to return to step 44 according to alternative "Yes". Even though the message received from the mobile station indicates an empty mobile station buffer, the receipt of the message indicates that the mobile station may have more data to transmit in a near future, whereby predictive scheduling is determined to restart. The right arrow marked as PING indicates decoded PING data transmitted from the base station to e.g. a core network. It should be mentioned that the decision to apply or restart predictive scheduling according to this method also could be based on any other of the previously mentioned reasons, such as an obtained service type indicator or depending on channel quality metrics.

If, in step 74, no information that triggers predictive scheduling is received, the method proceeds to step 76 according to alternative "No". In step 76, which will be further described with reference to FIG. 9, it is checked whether a Packet Inter Arrival Time, IAT, minus a margin, M, has expired or not. If it has expired this triggers the uplink traffic control device 21 to restart the predictive scheduling and the method to return to step 44 according to alternative "Yes". If it has not expired the method returns to step 74 according to alternative "No".

The decision to restart predictive scheduling based on the predicted next packet arrival time can be accomplished by training the packet Inter Arrival Time (IAT) statistics in the network. To ensure predictive scheduling starts earlier than the packet arrival time, a small margin, M, is subtracted from IAT when predicting the next packet arrival time as shown in FIG. 6. IAT is trained from statistics from previous transmissions and may be defined as the average time between receipt of BSR/SR/data that indicates a non-empty mobile station buffer to the time of receipt of a subsequent BSR/SR/data that indicates a non-empty mobile station buffer.

IAT may more specifically taken as the average time between T1 and T2; where T1 is the time when a first PING packet is received in the base station minus 4 ms. 4 ms is the time it takes for the mobile station to receive the grant until the time the PING is encoded and transmitted over the air. The time of 4 ms is however specific to 3GPP LTE. In case of retransmissions, the retransmission delay shall be taken into account. That is nrofReTx (number of retransmissions) times RTT (Round Trip Time). T1 is then the time when a first PING packet is received in the base station minus 4 ms minus nrofReTx multiplied by RTT. T2 is the time when the base station receives a non-zero BSR or a scheduling request.

The margin, M, can be of a predetermined constant value, e.g. x milliseconds, or M could be dependent on the value of IAT, e.g. x percentages of the value of IAT. With this proposal, the predictive scheduling request is based on the IAT which enables restart of the predictive scheduling without the mobile station sending a scheduling request. The scheduling delay is thus further reduced. It should be mentioned that the decision to restart predictive scheduling based on IAT may be made regardless of the reason for previously stopping performing predictive scheduling.

Furthermore, since the predictive scheduling in this embodiment is restarted when a packet is predicted to arrive the predictive scheduling based uplink transmission can be made more efficient and the mobile station battery can be saved. This approach is well suited for applications with predictable traffic pattern.

Furthermore, to further save energy for the mobile station, a predictive scheduling request may be aligned with DRX ON. By aligning DRX ON duration with a predictive scheduling request, energy can be further saved. When in DRX silent mode, the mobile station basically switches off the receiver and transmitter. By aligning a predictive scheduling request with the DRX pattern, i.e., by sending a predictive scheduling grant at DRX ON duration, the mobile station receiver can be switched off and the battery can be further saved. One example of DRX configuration is to set the inactivity timer to 1 ms, ON duration to 1 ms and DRX cycle to 2 ms.

Figure 10:
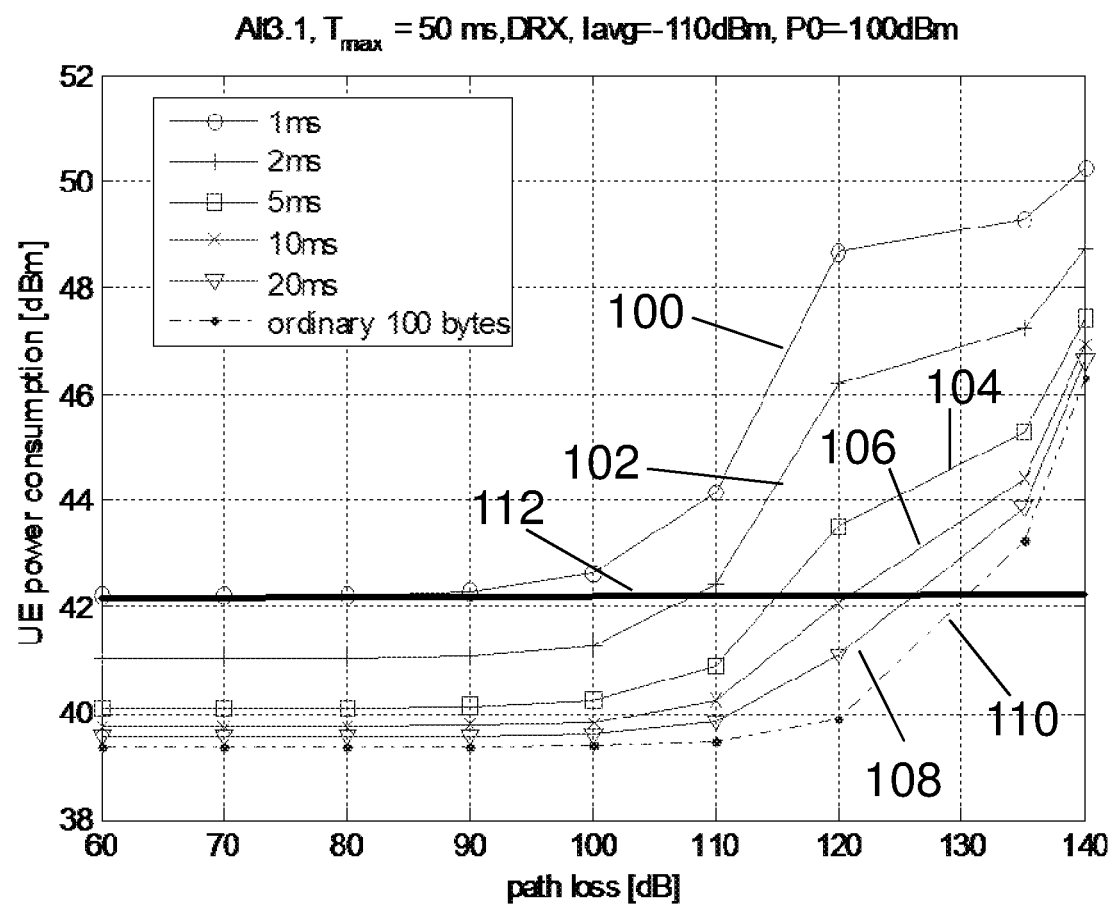
FIG. 10 illustrates a diagram showing an example of how the energy consumption varies for a mobile station based on a reference traffic model.

According an embodiment, the periodicity of the predictive scheduling is based on average channel quality for the mobile station. Examples of channel quality metrics are path loss (PL) and gain to interference plus noise ratio (GINR). FIG. 10 illustrates a diagram showing an example of how the energy consumption varies with path loss for a mobile station based on a reference traffic model. Five different functions are shown in the diagram. The uppermost function 100 is indicated with circles and shows how the power consumption for uplink transmissions for the mobile station varies with path loss when predictive scheduling is applied with an interval between consecutive uplink transmission grants being 1 millisecond. The second function 102 from the top of the diagram, indicated with vertical lines, shows an interval between consecutive uplink transmission grants being 2 milliseconds. The third function 104 from the top of the diagram, indicated with squares, shows an interval between consecutive uplink transmission grants being 5 milliseconds. The fourth function 106 from the top of the diagram, indicated with crosses, shows an interval between consecutive uplink transmission grants being 10 milliseconds. The fifth function 108 from the top of the diagram, indicated with triangles, shows an interval between consecutive uplink transmission grants being 20 milliseconds. Each of these five functions shows the scenario when the mobile station transmits a ping packet of 100 bytes. Further a sixth function 110 is shown in the diagram and indicated with dots. This function shows how the power consumption for the mobile station varies with path loss when the mobile station is transmitting data with a size of 1500 bytes. Also shown in the figure is a reference power consumption level 112, which is the mobile station power consumption when transmitting a packet having a size of 1500 bytes at a cell edge and experiencing a path loss of 115 dB. This reference power consumption level 112 is thus in this embodiment equal to the value of the mobile station power consumption when the sixth function 112 experiences a path loss of 115 dB, i.e. approximately equal to 42 dBm. The reason for setting it to 115 dB is that in this embodiment a mobile station becomes power limited at a path loss of 115 dB, which means that more transmissions are needed and thus higher power consumption at higher path loss.

As can be seen in the FIG. 10, in order for the mobile station to fall short of the reference power consumption level when transmitting ping packets of 100 bytes, the uplink traffic control device may provide predictive scheduling at (approximately) a periodicity of 1 milliseconds when the path loss is below 90 dB, 2 milliseconds when the path loss is below 108 dB, 5 milliseconds when the path loss is below 115 dB, 10 milliseconds when the path loss is below 121 dB and finally 20 milliseconds when the path loss is below 126 dB. These figures will of course be different in case e.g. the data sizes of the transmitting ping packets are changed.

By measuring the path loss and adapting the periodicity of the uplink transmission scheme when the path loss for the mobile station exceeds threshold values, a trade-off between scheduling latency and power consumption is achieved. According to the example described above and shown in FIG. 10 the periodicity of the predictive scheduling is set to change: from 1 ms to 2 ms when a path loss exceeding 90 dB (but being below 108 dB) is detected, from 2 ms to 5 ms when a path loss exceeding 108 dB (below 115) is detected, from 5 ms to 10 ms when a path loss exceeding 115 dB (below 126) is detected, and from 10 ms to 20 ms when a path loss exceeding 126 dB is detected. Correspondingly the periodicity of the predictive scheduling is set to change from 20 ms to 10 ms when a path loss falling short of 115 dB (but being above 108) is detected, etc.

By changing the uplink transmission scheme depending on detected path loss by e.g. modifying the periodicity of the predictive scheduling grants, the scheduling latency is decreased while also limiting the power consumption for a mobile station experiencing a high path loss, e.g. for a mobile station located in a cell edge. With this adaptive predictive scheduling periodicity scheme, the tradeoff between scheduling delay and mobile energy consumption is obtained. A mobile station with good channel quality metrics will be scheduled with shorter periodicity and thus shorter scheduling delay; a user with poor channel quality will be scheduled with longer periodicity which indicates longer scheduling delay. From the energy perspective, a mobile with good channel quality will be scheduled with more pre-scheduling transmissions comparing to mobile stations with bad channel quality. However, a mobile station that has a higher channel quality will need fewer transmissions and a lower power consumption to transmit the same amount of data as a mobile station having a lower channel quality. Thus, the uplink transmission energy balance between mobile stations experiencing good and bad channel quality can be obtained. Thus, not only latency but also battery consumption is optimized to maintain the best performance. Furthermore, a mobile station with a high average channel quality is typically located in the center of a cell, thus generating less inter cell interference, whereas a mobile station with lower channel quality is typically located in a cell edge and thus generating more inter cell interference. This allows more uplink transmissions in the cell center but fewer transmissions at the cell edge, which can thus lower the inter cell interference.

In the example given above the uplink traffic control device was provided in the first base station. It should be realized that it may be provided in another network node instead, which communicates with the first base station.

Furthermore, a lot of the above described functionality may be omitted. It is for instance possible that the battery consumption is not estimated or that higher priority traffic is not considered. It is also possible to omit the considering of historical or statistical data as well as the use of the buffer with artificial data.

The uplink scheme determining module of the uplink traffic control device may be provided as a dedicated circuit such as a digital signal processor (DSP) or an Application Specific Integrated Circuit (ASIC). As an alternative it may be provided in the form of a processor with associated program memory including computer program code for performing the functionality of its units.

Figure 11:
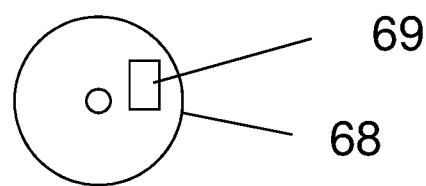
FIG. 11 schematically shows a computer program product in the form of a CD ROM disc with a computer program performing the functionality of the solution according to the present disclosure.

This computer program may also be a computer program product, for instance in the form of a computer readable storage medium or data carrier, like a CD ROM disc or a memory stick, carrying such a computer program with the computer program code, which will implement the function of the above-described module when being loaded into an uplink traffic control device. One such computer program product in the form of a CD ROM disc 68 with the above-mentioned computer program code 69 is schematically shown in FIG. 11.

What is claimed is:

1. A method in a network node for controlling predictive scheduling in a wireless communication network between a base station applying the predictive scheduling and a mobile station, according to an uplink transmission scheme, wherein the uplink transmission scheme schedules a plurality of uplink transmission grants, based on the predictive scheduling, to be transmitted from the base station to the mobile station without having received a scheduling request from the mobile station requesting the uplink transmission grants, the method comprising:
   determining a discontinuous reception (DRX) configuration for the mobile station; and
   aligning the uplink transmission scheme of the predictive scheduling with the DRX configuration by:
      sending predictively scheduled uplink transmission grants from the base station to the mobile station during DRX ON state; and
      refraining from sending the predictively scheduled uplink transmission grants from the base station to the mobile station during DRX OFF state.

2. The method according to claim 1, wherein a duration of the DRX ON state is 1 ms.

3. The method according to claim 1, wherein a DRX cycle is 2 ms and a duration of the DRX ON state is 1 ms.

4. The method according to claim 1 further comprising determining a periodicity of the predictively scheduled uplink transmission grants based on channel quality for the mobile station.

5. The method according to claim 1, further comprising applying the predictive scheduling based on buffer status of the mobile station.

6. A network node for controlling predictive scheduling in a wireless communication network between a base station and a mobile station, the network node configured to initiate predictive scheduling for the mobile station according to an uplink transmission scheme, wherein the uplink transmission scheme schedules a plurality of uplink transmission grants, based on the predictive scheduling, to be transmitted from the base station to the mobile station without having received a scheduling request from the mobile station requesting the uplink transmission grants, the network node comprising:
   a processor; and
   a memory containing instructions which, when executed by the processor, cause the network node to perform operations to:
      determine a discontinuous reception (DRX) configuration for the mobile station; and
      align the uplink transmission scheme of the predictive scheduling with the DRX configuration by performing operations to:
         send predictively scheduled uplink transmission grants from the base station to the mobile station during DRX ON state; and
         refrain from sending the predictively scheduled uplink transmission grants from the base station to the mobile station during DRX OFF state.

7. The network node according to claim 6, wherein a duration of the DRX ON state is 1 ms.

8. The network node according to claim 6, wherein a DRX cycle is 2 ms and a duration of the DRX ON state is 1 ms.

9. The network node according to claim 6 further performing operations to determine a periodicity of the predictively scheduled uplink transmission grants based on channel quality for the mobile station.

10. The network node according to claim 6, further performing operations to apply the predictive scheduling based on buffer status of the mobile station.

11. A non-transitory computer readable storage medium having stored thereon computer program code which, when executed by a processing device of a network node, is capable of causing the network node to have a base station apply predictive scheduling of uplink traffic from a mobile station in a wireless communication network, according to an uplink transmission scheme, wherein the uplink transmission scheme schedules a plurality of uplink transmission grants, based on the predictive scheduling, to be transmitted from the base station to the mobile station without having received a scheduling request from the mobile station requesting the uplink transmission grants, by performing operations comprising:

determining a discontinuous reception (DRX) configuration for the mobile station; and aligning the uplink transmission scheme of the predictive scheduling with the DRX configuration by:

sending predictively scheduled uplink transmission grants from the base station to the mobile station during DRX ON state; and refraining from sending the predictively scheduled uplink transmission grants from the base station to the mobile station during DRX OFF state.

12. The non-transitory computer readable storage medium according to claim 11, wherein a duration of the DRX ON state is 1 ms.

13. The non-transitory computer readable storage medium according to claim 11, wherein a DRX cycle is 2 ms and a duration of the DRX ON state is 1 ms.

14. The non-transitory computer readable storage medium according to claim 11, wherein the computer program code is further capable of causing the network node to perform operations comprising determining a periodicity of the predictively scheduled uplink transmission grants based on channel quality for the mobile station.

15. The non-transitory computer readable storage medium according to claim 11, wherein the computer program code is further capable of causing the network node to perform operations comprising applying the predictive scheduling based on buffer status of the mobile station.

* * * * *